Figure 1:
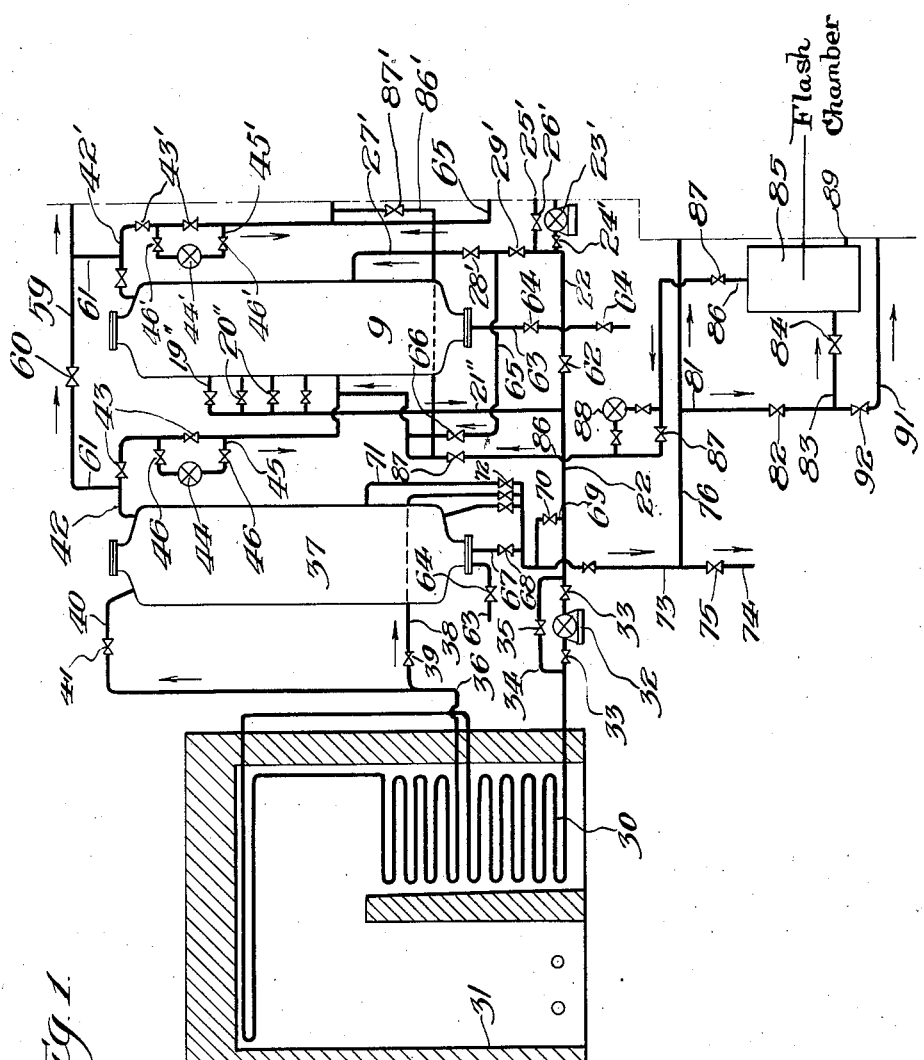

April 19, 1932. C. P. DUBBS 1,854,463
TREATMENT OF HYDROCARBON OIL
Filed July 30, 1927  2 Sheets-Sheet 1

Witness:
Stephen F. Pelora

Inventor:
Carbon P. Dubbs,
by Frank L. Belknap
Atty.

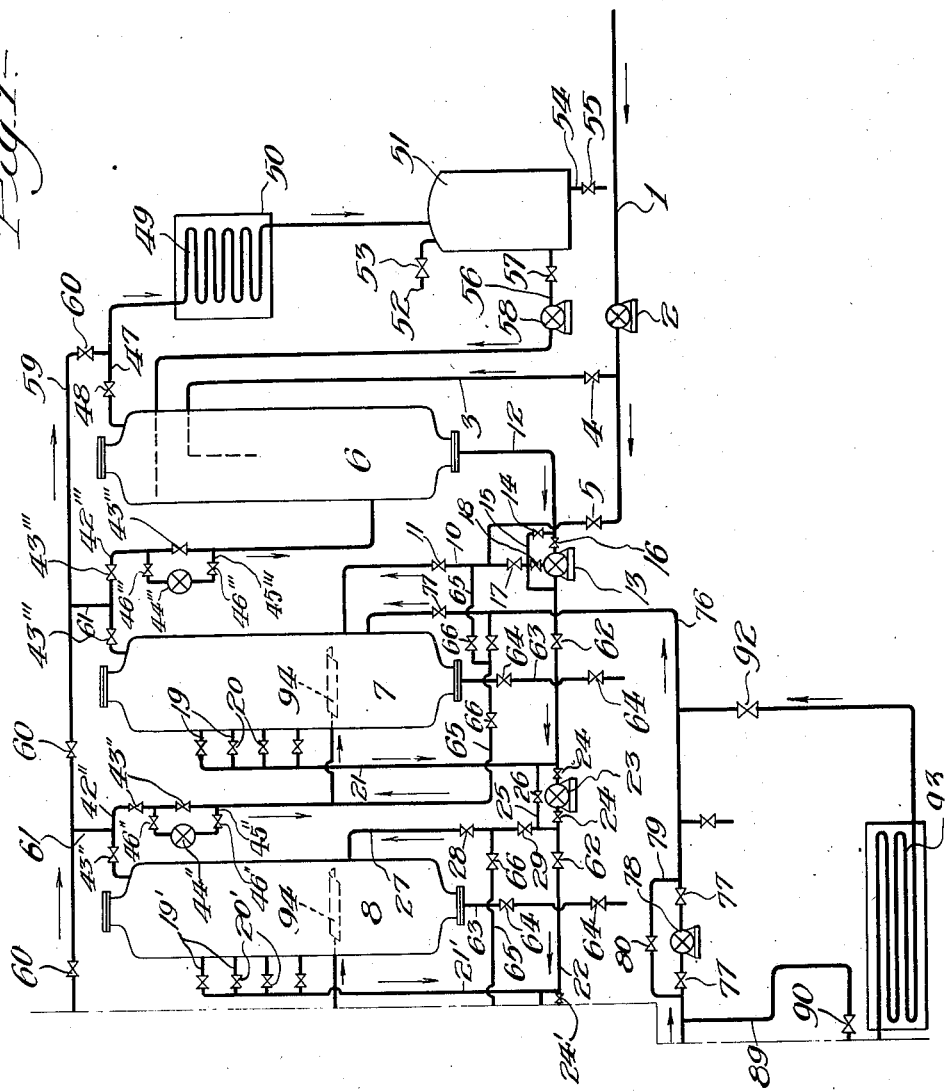

Patented Apr. 19, 1932

1,854,463

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OIL

Application filed July 30, 1927. Serial No. 209,632.

The present invention relates to improvements in hydrocarbon oil conversion, and refers more particularly to the conversion of heavy or high boiling point range hydrocarbons to produce therefrom lower boiling point hydrocarbons suitable for commercial use, for instance, as motor fuel.

The invention is characterized by the fact that it can be operated at atmospheric pressure or under superatmospheric pressure, but in either event it is preferable that the oil be subjected to conditions of cracking temperature whereby a substantial conversion takes place.

The principal object of the present invention is to provide a process and apparatus having a wide range of flexibility, which process and apparatus are adapted to the efficient treatment of any character of charging stock including heavy crudes, topped crude, petroleum distillates and residue, and for the production of the desired types of products.

Other objects of the invention are to provide a process and apparatus in which the oil being treated, may be fractionally distilled and subjected to a cracking or breaking up, and to a polymerization to convert the heavier hydrocarbons into lighter hydrocarbons, such lighter oil being fractionally separated as one uninterrupted process, and during such process passing the released vapors and generated gases through the liquid body, thus reducing the amount of uncondensable gases and coke; to provide a method and apparatus in which a series of chambers are employed, and in which the hydrocarbons treated are subjected to progressively increasing temperatures; to provide a method and apparatus in which the vapors and gases are subjected to progressively decreasing temperatures, the vapors and gases being preferably caused to percolate through the oil in the various chambers, advancing from those having higher temperatures to those wherein lower temperatures are maintained; to provide a method and apparatus wherein the vapors, gases and liquid are brought into intimate contact with each other in zones of reaction; to provide a process and apparatus in which the heavier products of the reaction are withdrawn and caused to be introduced into a zone of lower temperature, passing successively back through zones of increasing temperature, being brought into contact therein with the liquid, and particularly with the vapors from which said heavier products of reaction were separated in a previous reaction zone; to provide a process and apparatus wherein the character and gravity of the residue produced, can be accurately controlled and regulated; to provide a process and apparatus of this general character in which by controlling the conditions of operation, the residue produced may comprise a liquid, a semi-liquid, a semi-solid or solid, that is, the conditions of operation may be controlled so as to produce liquid residue or non-liquid residue.

The utility of the invention, as well as other objects and advantages will hereafter more fully appear.

Figs. 1 and 1a together form a diagrammatic side elevational view of apparatus in which the invention may be carried out.

Referring in detail to the drawings, 1 designates the charging stock inlet line in which may be interposed the pump 2. Line 3 controlled by valve 4 may branch out from the charging line 1, and a valve 5 may be interposed in line 1. Line 3 may have communication with the first of a series of serially connected chambers 6, 7, 8 and 9, which may comprise metal shells suitably insulated to prevent loss of heat by radiation, and provided with suitable cleaning manholes. Instead of feeding the charging stock into the chamber 6, all or a portion of it may be diverted by closing valve 4 and opening valve 5, in the line 10 in which may be interposed a valve 11, discharging the charging stock into the chamber 7. In either event, the charging stock introduced to either the chamber 6 or 7 will be brought into physical contact with vapors from a preceding chamber whereby heat is transmitted to the charging stock while the charging stock acts as a cooling medium, to condense the heavier fractions of the vapors. Assume that charging stock has been introduced through the line 3 into the chamber 6 wherein said oil was subjected to contact with vapors introduced from the chamber 7, the unvaporized charging stock together with reflux may be withdrawn through the line 12 and introduced to the line 10 if desired, under pressure imposed by the pump 13. The pump may be by-passed by opening valve 14 in line 15, and closing valve 16 in line 12. Line 10 may be provided with valves 17 and 18. The oil being introduced to the chamber 7 will build up to any desired level, controlled by means of the overflow pipes 19 in which may be interposed the valves 20 communicating with the header 21. The header 21 communicates with line 22 in which may be interposed the pump 23 controlled by valves 24. A by-pass 25 controlled by valve 26 may be interposed between the header 21 and the line 27 for the purpose of by-passing the pump 23, should it be desirable.

Valves 28 and 29 may be interposed in the line 27, which line 27 communicates with the chamber 8. The line 27 communicates with a continuation of the line 22. Oil being introduced to the chamber 8 may overflow through any of the overflow lines 19' controlled by valves 20', said overflow lines 19' communicating with the header 21'. The header 21' communicates with an extension of the line 22 in which is interposed the pump 23' controlled by valves 24', which pump may be by-passed through by-pass line 25' controlled by valve 26'. The discharge of the pump 23' and the by-pass line 25' communicate with the line 27' in which are interposed the valves 28' and 29'. The line 27' communicates with chamber 9. The overflow from chamber 9 may pass out through any one or more of the overflow pipes 19'' controlled by valves 20'' discharging into the header 21'' communicating with an extension of the line 22. The line 22 may feed unvaporized liquid to the heating coil 30 mounted in the furnace designated diagrammatically at 31. Adjacent to the entrance of the heating coil 30 a pump 32, controlled by valves 33, which may be by-passed through by-pass line 34 controlled by valve 35, may be interposed in the charging line 22. During passage through the heating coil 30, the oil is raised to a conversion temperature, and is discharged into the transfer line 36 which may discharge into a reaction chamber 37 either into the lower portion thereof through line 38 controlled by valve 39, or into the upper portion thereof through line 40 controlled by valve 41. The chamber 37 may be externally unheated, if found more desirable, in which event it may be insulated to prevent excess radiation of heat. Separation of the products of reaction takes place in the chamber 37, that is, the vapors separate from the non-vaporous products of reaction, said vapors being removed through the line 42 in which may be interposed the valves 43, said vapor line 42 discharging into the first of the serially connected chambers 9. Similar lines 42', 42'' and 42''' controlled by valves 43', 43'' and 43''' may pass the vapors respectively from chamber 9 through succeeding chambers 8, 7 and 6.

Vapor pumps 44, 44', 44'', 44''' in by-pass lines 45, 45', etc. controlled by valves 46, 46', etc. may be interposed in the vapor lines 42, 42', 42'' and 42''' for the purpose of imposing a pump pressure on said vapors, if found desirable. The inlet from the vapor lines to each chamber may be a point intermediate its height as illustrated, which point may be adjacent to the lower end of each chamber, if found desirable. It is important to note that the oil being introduced to the lines 10, 27 and 27' and into the chambers 7, 8 and 9 respectively, should be introduced at a point at which a volume of oil will be present in the chamber sufficient to permit separation of heavy hydrocarbons in semi-solid, or solid form.

It is also important to note that the vapors when introduced to the chamber, should be introduced at a point just above the point of introduction of the oil, although it may be desired to vary this.

Vapors remaining uncondensed after passage through the various chambers may be removed through the line 47, in which may be interposed the valve 48, the line 47 communicating with condenser coil 49 mounted in condenser box 50 wherein the vapors are condensed and passed to a suitable receiver 51 which may be provided with gas relief line 52 controlled by valve 53. The receiver 51 may also be provided with liquid drawoff line 54 controlled by valve 55, as well as with distillate return line 56 in which may be interposed the valve 57 and pump 58. The distillate return line 56 is utilized to return regulated portions of the distillate to the chamber 6 for the purpose of more completely dephlegmating the vapors before they are removed through the vapor outlet 47, thus permitting the production of the so called end point distillate, that is, a distillate conforming generally to commercial requirements for motor fuel, as to initial and end point range, gravity, etc.

In use and operation, the charging stock is caused to pass successively through zones of progressively increasing temperature, countercurrent to the flow of the vapors with which said charging stock is brought into direct contact. In each of the chambers 6, 7, 8, and 9 the vapors are caused to percolate through a body of oil maintained therein, thus scrubbing said vapors and assisting in their fractionation, while at the same time imparting heat to the oil and vaporizing the lighter fractions thereof. This repeated scrubbing of the vapors by causing same to pass through the bodies of oil, imparts very beneficial characteristics to the products, for instance, one of the desirable characteristics imparted to the distillate is that it makes it easier to subsequently treat.

Provision is made for by-passing any of the chambers, both with regard to liquid and regard to vapor. To cause a by-pass of any of the chambers with regard to the vapor, I provide a vapor header 59 controlled by valves 60 and connected by means of the branch 61 to each of the vapor transfer lines between adjacent chambers.

Any of the chambers may be by-passed with regard to liquid by using the header 22 heretofore described, and closing and opening the necessary valves. To permit this, the header 22 is provided with halves 62. Each of the chambers is provided with a drain 63 through which liquid or solids or both, may be removed. Valves 64 may be interposed in each of the drains 63.

Instead of introducing the liquid from a preceding chamber or from the charging stock supply line, into the chamber at the right hand side thereof as illustrated in the drawings, the desired valve or valves may be manipulated and the oil diverted through the line 65 controlled by the valves 66 merging with the vapors being introduced through the vapor transfer line, thus bringing about an intermingling of the vapors and liquid prior to being introduced to the chamber.

The depth of liquid maintained in each of the chambers 7, 8 and 9 is controlled by means of the drawoffs 19, 19' and 19'' respectively, the regulation of which depth also regulates the degree of percolation, which thus controls the fractionation, heat exchange, reaction, and to a certain extent, the character of the final products. In this manner, the preheated charging stock combines with the condensate in each of the chambers, and passing successively from chamber to chamber, the portions thereof remaining unvaporized, finally reach the heating coil 30.

In starting up the operation, the charging stock is preferably introduced directly from the charging header 22 into the heating coil 30 where said charging stock is raised to a conversion temperature, being transferred to the reaction drum 37 where separation of vapors takes place, said vapors being initially passed to the vapor header 59, and condensed in condenser 49, the residue being withdrawn through the bottom drain 67 controlled by valve 68 and introduced to the line 69 controlled by the valve 70 to the charging line 22 being locally recirculated until the proper temperatures are reached. Subsequent to this, the valve 60 in vapor header 59 is closed, the valve 43 in vapor line 42 opened, thus permitting transfer of the vapors from the chamber 37 to the first chamber 9 of the series. At this time, the supply of charging stock directly to the heating coils is stopped, and charging stock is fed through charging line 27' from the charging header 22 into the chamber 9, the unvaporized portion of the charging stock being discharged through any of the drawoff lines 19'' and returned through the header 21'', to the charging header 22. The vapors are passed through the branch 61 into header 59 and condensed in the condenser 49. The same operation is repeated successively for each of the chambers 9, 8, 7 and 6 until the entire plant is operated under the desired temperature conditions.

It is of importance to note that each of the chambers is cut into operation one at a time, and that the vapors and charging stock are introduced to that chamber at about the same time. It is of course obvious, that other methods of starting may be used, but it is thought well to illustrate one particular method which has been found satisfactory.

After the plant is in operation, the residue produced in the chamber 37 may be withdrawn through any of the drawoff lines 71 controlled by valves 72, preferably the bottom line, and introduced into the header 73 which is provided with the drain 74 and valve 75. In operation, the valve 75 is closed, and said residue diverted through the line 76 to the chamber 7. Valves 77 and pump 78 may be interposed in the line 76. A by-pass 79 controlled by valve 80 may also be interposed in said line 76. The non-vaporous fractions are drawn off from the reaction chamber 37 before being permitted to be converted to any substantial degree of coke. This may be obtained by controlling the degree of reaction in the heating coil 30 and reaction chamber 37, and by regulating the level of the non-vaporous fractions in said reaction chamber. The hot non-vaporous fractions from the chamber are then introduced into the chamber 7 as heretofore described, and are thereby subjected to the cooling action due to their commingling with the cooler charging stock introduced through the line 10 and with the vapors introduced through line 42''. This cooling action stops any further reaction that might take place in the residuum, and keeps the latter relatively free from heavy pitch, coke and sludge. Furthermore, by commingling with the relatively light vapors in chamber 7, the residuum is subjected to a diluting action from a part of these vapors, and this tends to separate the lighter liquid portions of said residue from the heavier pitch or coke containing portions. The latter deposit at the bottom of chamber 7 and may be left to accumulate, or may be withdrawn continuously or intermittently through the line 63, valve 64 being open.

It is to be noted that in the preferred form of operation, the residuum from the reaction chamber 37 is not introduced into the last chamber 6, in which purifying action of the vapors is preferably allowed to take place. It is understood that should it be desirable, the residue may be introduced to the last chamber, or to any of the other chambers. In this manner, the residuum free from heavier pitch and coke containing products in chamber 7 combines with the raw charging stock and condensate from the vapors in chamber 7, and passes out therefrom through any of the lines 19, and then by pipes 21 and 27 into the next preceding chamber as heretofore described. This is repeated for any one of the next preceding chambers. In this manner, any heavy fractions contained in the residuum, and which would promote heavy formation of coke should they be retreated, separate from the relatively lighter portions of the residuum in the series of chambers 7, 8 and 9, and the charging stock directed from the chamber 9 to the cracking coil 30 is relatively clean.

The entire plant may be operated under atmospheric pressure, that is, only such pressure as is necessary to overcome frictional resistance being maintained, or certain parts of the plant may be maintained under superatmospheric pressure, which superatmospheric pressure may be uniform or differential pressures may be employed. When the heating coil 30 and reaction chamber 37 are operated under pressure, it may be desirable to flash the residue withdrawn through the line 71 before being returned to the chamber 7, in which event it is diverted from the line 76 to the line 81 controlled by valve 82, to the line 83 controlled by the valve 84 to the flash chamber 85, the vapors released in flashing due to reduction in pressure, being removed through line 86 controlled by valve 87 and returned to any one of the chambers, for instance, chamber 9, a vapor pump such as illustrated at 88 being interposed in said line to supply the necessary pressure thereto or to chamber 8 through line 86′ controlled by valve 87′. The selection of the chamber to which the vapors from the flashing of the residuum are returned, is such that the vapors from the next preceding higher temperature chamber have approximately the same characteristics or are heavier than said vapors from flashing. In this operation, only the heavier portion of the residuum drawn off from the reaction chamber 37 is returned to the chamber 7 in liquid form. To accomplish this, the line 89 controlled by valve 90 may connect with the line 76.

It may be desirable in some instances, to supply the residue withdrawn through the line 71 before it is returned to chamber 7, to a cooling action. To accomplish this, I provide a continuation 91 of the line 81 controlled by the valves 92 in which may be interposed a cooler 93, the other end of said line 91 communicating with the line 76.

The most desirable method of operating the plant described in the foregoing specification, and illustrated in the drawings, will of course, depend upon the kind of charging stock being treated, and the types of products desired. Where it is desirable to produce a normal yield of overhead products to be condensed as motor fuel, and it is further desired to produce a quantity of liquid residue for use as fuel or the like, the operation may be carried out as follows: The charging stock is preferably introduced into and passed through the chambers where no residuum from the reaction chamber 37 is passed, for instance, the charging stock may be introduced by the proper manipulation of the valves and pumps shown to the chamber 8 through the line 27, and passed as heretofore described, through the chamber 9, coil 30 and reaction chamber 37, together with the condensed portions of the vapors in chambers 8 or 9. The residuum from the reaction chamber 37 will then be introduced into chamber 7 wherein it will be subjected to the scrubbing of the relatively cool vapors therein, which will cause separation of the heavy pitch carrying fractions and dilution of the residuum with the relatively light condensate, which will result in the production of a fluid residuum containing substantially no coke or sludge.

The charging stock may be passed through any desired number of chambers, and similarly any desired number of chambers can be utilized for purifying residuum. The residuum is withdrawn from chamber 7 or from the last of the chambers through which it was passed through drain line 63 and sent to storage.

In this method of operation, it is preferable to regulate the fractionation of the vapors in the series of chambers 6, 7, 8 and 9 in such a manner that a greater degree of fractionation is effected in the chambers through which the charging stock is charged, only a relatively small degree of fractionation and condensation being effected in the chambers where the residuum is purified. This is to decrease the proportion of condensate used in the purification and dilution of the residuum.

Another preferred method of operation consists in producing substantially no liquid residuum from the process, and in this operation the residuum drawn off the chamber 37 is only the intermediate product. In this operation the residuum is returned into and through the chambers 7, 8 and 9 together with the charging stock, and passes through all the chambers. Deposition and separation of the heavy coke and pitch from the residum takes place in the chambers 7, 8 and 9, and all portions of the residuum not separated in these chambers in the form of coke or heavy pitch is returned with the charging stock and condensate from the vapors from each chamber to the next preceding higher temperature chamber, and thence through the heating coil to the reaction chamber 37, this operation being performed and continued until substantially all the charging stock has been converted into motor fuel and coke, and until the chambers are filled with solid residuum.

It is very important to note that the vapors from the preceding chamber are introduced into the liquid body in a succeeding chamber in such a manner as to prevent any severe agitation in that chamber. To accomplish this, an umbrella shaped shield may be provided immediately adjacent the discharge from the vapor line illustrated diagrammatically at 94.

It will be apparent from the foregoing description of the process, it is extremely flexible and permits the use of any type of charging stock and the production of any type of products by regulation of the conditions of operation.

I intentionally do not wish to limit myself to any particular temperatures or pressures or yields, or to the type of charging stock and type of product which may be produced, as they may vary widely within the scope of the invention. Any of the chambers may be cut out of operation, and by-passed by means of the valves in lines illustrated and described. The charging stock, and the residium, free of charging stock, from the reaction chamber 37 may be passed through the same or separate chambers, and the vapors may or may not be caused to percolate through any one of these chambers according to the result desired. For instance, while I have heretofore described the percolation of the vapors through the chambers where the residium is passed, it is understood that this is not necessary, and the vapors may not be passed through said chambers, which would then be used for coke separating chambers.

I claim as my invention:

1. A process for cracking oil comprising subjecting heavy oil to pressure distillation at a cracking temperature, causing substantial vaporization in and taking off vapors from said pressure distillation zone, said vapors including heavier insufficiently cracked fractions, separately removing unvaporized oil from said pressure distillation, subjecting said vapors to fractionation to condense heavier insufficiently cracked fractions, subjecting said unvaporized oil independently of said vapors to further distillation by its contained heat in a zone of reduced pressure, combining vapors resulting from said further distillation of the unvaporized oil with a fraction of vapors of like character and containing heavier insufficiently cracked fractions taken off from the pressure distillation.

2. A process for cracking oil comprising subjecting heavy oil to pressure distillation at a cracking temperature, taking off vapors from said pressure distillation zone, separately removing unvaporized oil from said pressure distillation, subjecting said vapors to fractionation, subjecting said unvaporized oil to further distillation by its contained heat in a zone of reduced pressure, combining vapors resulting from said further distillation of the unvaporized oil with a fraction of vapors of like character taken off from the pressure distillation, and causing the commingled vapors to percolate through succeeding bodies of infed charging oil being supplied to the pressure distillation.

3. A process for cracking hydrocarbon oil comprising maintaining a plurality of serially connected pools of oil, continuously supplying fresh charging oil to the pool at one end of the series, continuously removing unvaporized oil from the pool at the opposite end of the series, subjecting the removed unvaporized oil to a pressure distillation at a cracking temperature, separately removing vapors and unvaporized residue from the pressure distillation zone, releasing further vapors from the unvaporized oil removed from the pressure distillation in a zone of reduced pressure, commingling the vapors removed from the unvaporized residual oil in the zone of reduced pressure with vapors removed from the pressure distillation, percolating the resulting commingled vapors through certain of said serially connected pools of oil, subjecting the vapors which escape condensation by percolation through said pools of oil to condensation and recovering the resulting distillate as the product of the process.

In testimony whereof I affix my signature.

CARBON P. DUBBS.